(12) United States Patent
Wen

(10) Patent No.: US 6,342,897 B1
(45) Date of Patent: Jan. 29, 2002

(54) METHOD AND SYSTEM FOR COMPENSATING FOR NON-UNIFORM COLOR APPEARANCE OF A DISPLAY DUE TO VARIATIONS OF PRIMARY COLORS

(75) Inventor: Sen-Far Wen, Hsinchu (TW)

(73) Assignee: DynaScan Technology Corporation, Hsin-Chuang (TW)

( * ) Notice: Subject to any disclaimer, the term of this patent is extended or adjusted under 35 U.S.C. 154(b) by 0 days.

(21) Appl. No.: 09/465,501

(22) Filed: Dec. 16, 1999

(51) Int. Cl.$^7$ .............................................. G06T 11/40
(52) U.S. Cl. ........................ 345/589; 345/590; 345/88; 348/234
(58) Field of Search ................................ 345/589, 591, 345/590, 592, 593, 597, 600, 603, 604, 605, 88, 207, 72, 690; 348/34, 29, 234, 659; 382/133

(56) References Cited

U.S. PATENT DOCUMENTS

| | | | | |
|---|---|---|---|---|
| 5,231,504 A | * | 7/1993 | Magee | 358/80 |
| 5,315,378 A | * | 5/1994 | Satou et al. | 345/655 |
| 5,956,015 A | * | 9/1999 | Hino | 345/600 |
| 6,243,070 B1 | * | 6/2001 | Hill et al. | 345/589 |
| 6,271,825 B1 | * | 8/2001 | Green et al. | 345/88 |

* cited by examiner

Primary Examiner—Matthew Luu
Assistant Examiner—Thu-Thao Havan
(74) Attorney, Agent, or Firm—Kolisch Hartwell Dickinson McCormack & Heuser

(57) ABSTRACT

A method for compensating for the non-uniform color appearance of a color display is disclosed. Since there are variations of the chromaticity coordinates for each primary of every pixel in a display, the color appearance is not uniform. From the distribution of the chromaticity coordinates of the original primaries, we can choose a set of virtual primaries so that the chromaticity coordinates of each virtual primary can be produced by the original primaries in every pixel. The virtual primaries are used as the primaries of the display in stead of the original primaries. Because the chromaticity coordinates of the virtual primaries are the same for all pixels, the color appearance can be made to be uniform. This method is called the virtual primary method. LED displays are taken as an example to show this method. From the it condition where the tristimulus values of the LEDs, which are the original primaries, in a pixel are equal to those of the virtual primaries, we have the formulas converting RGB video signals into modified RGB video signals which are the input video signals of the LEDs. The systems implemented according to the formulas are able to compensate for the non-uniform color appearance of the LED displays.

16 Claims, 9 Drawing Sheets

METHOD AND SYSTEM FOR COMPENSATING FOR NON-UNIFORM COLOR APPEARANCE OF A DISPLAY DUE TO VARIATIONS OF PRIMARY COLORS

BACKGROUND OF THE INVENTION

1. Field of the Invention

This invention relates to a method compensating for the non-uniform color appearance of a color display. If there are the variations of chromaticity coordinates for each primary of every pixel in a display, the color appearance is not uniform. From the distributions of the chromaticity coordinates of original primaries, we can choose a set of virtual primaries so that the chromaticity coordinates of each virtual primary can be produced by the original primaries in every pixel. The virtual primaries are used as the primaries of the display in stead of the original primaries. Thus the color appearance can be uniform because the chromaticity coordinates of the virtual primaries are the same for all pixels. LED displays are taken as examples to show this method. From the condition that the tristimulus values of the LEDs, which are the original primaries, in a pixel are equal to those of virtual primaries, we have the formulas converting RGB video signals into modified RGB video signals which are the input video signals of the LEDs. The systems implemented according to the formulas are able to compensate for the non-uniform color appearance of the LED displays.

2. Prior Art Description

An image display usually consists of an enormous number of pixels. For a color display, a pixel is able to emit the light that contains three primary colors. For some display technologies, the color appearance is not uniform. For example, a primary color of the same luminance is to be displayed on the entire screen, different portions of the screen display different colors. Once a primary color cannot be uniformly displayed, a displayed image containing multicolor will be distorted. The non-uniform color appearance is a major deteriorate factor for light emitting diode (LED) displays. For a dot-matrix LED display, a pixel contains a set of red, green, and blue LEDs. For a scanning LED display, a raster image is created by one or many linear arrays of LEDs. Both LED displays require a large number of LEDs. Because the variations of the optical and electrical properties of LEDs are significant due to fabrication process, the homogenous quality of the color appearance of LED display is usually not good. For example, though manufacturers have sorted LEDs before shipment, greater than 10% variation of the chromaticity coordinates of the same rank LED is common for blue and green LEDs. Such a variation is not acceptable for uniform color appearance. One may further sort LEDs to reduce the variation. For a dot-matrix LED display of 800×600 resolution, it requires at least 480,000 LEDs for a single color because more LEDs of the same color may be used in a pixel to increase brightness. The number is so large that the sorting method is impractical. For a scanning LED display, though we can use the sorting method because the number of LEDs is much smaller than dot-matrix LED display, the color appearances of different displays may be different and a number of spare LEDs for an individual display is required for maintenance.

This invention relates to a method compensating for the non-uniform color appearance caused by the variations of the chromaticity coordinates of the primaries. Ideally the chromaticity coordinates of each primary of every pixel of a display are the same so that the color appearance is uniform. For the cases of LED displays, there are variations of chromaticity coordinates for each primary of every pixel and the color appearance is not uniform. Applying the color compensating method, the color appearance can be uniform. This method can also be applied to other technologies of color display. In the description of this invention, we take LED displays as examples. At first, we have to know the distributions of the chromaticity coordinates of red, green, and blue LEDs that are the light sources of the primaries. Such primaries are called the original primaries to distinguish them from the virtual primaries defined below. From the distributions, we can choose a set of three virtual primaries so that the chromaticity coordinates of each virtual primary can be produced by the original primaries in every pixel. Thus we can use the virtual primaries instead of the original primaries as the primaries of a display. The three primaries are "virtual" because the three respective light sources do not really exist in the display. The light of a virtual primary usually comes from the light sources of three original primaries. As the chromaticity coordinates of the virtual primaries are the same for all pixels, the color appearance of the display is uniform and, furthermore, the color appearances of different displays are the same. Therefore we call this color compensating method as The Virtual Primary Method. Systems to implement the Virtual Primary Method are also described, which execute computations to determine the luminous intensities of each of the original primaries.

SUMMARY OF THE INVENTION

The primary color light of a color display may be emitted from many light sources. When the chromaticity coordinates of the light sources are not the same, the color appearance is not uniform. A virtual primary method was invented to compensate for the non-uniformity. For a full-color display, red, green, and blue primaries are required. From the distributions of the chromaticity coordinates of the three original primaries, we can choose a set of three virtual primaries so that the chromaticity coordinates of each virtual primary can be produced by the original primaries in every pixel. The maximum luminous intensity of each virtual primary is properly chosen so that the required luminous intensities of the original primaries to produce a virtual primary are always not negative. Furthermore the ratios among the maximum luminous intensities of virtual primaries are chosen based on a white balance condition. The virtual primaries are used as the primaries of the display, and the color appearance can be uniform because the chromaticity coordinates of the virtual primaries are the same for all pixels. LED displays are taken as an example to show this method. To quantitatively describe color appearance, the CIE 1931 color space is used. The luminous intensity and the chromaticity coordinates of every LED under a required rating operating current in an LED display are measured. The maximum luminous intensity and the chromaticity coordinates of the virtual primaries are chosen according to the measured data. From the condition that the tristimulus values of the LEDs, which are the original primaries, in a pixel are equal to those of the virtual primaries, we derive the formulas converting RGB video signals into modified RGB video signals which are the input video signals of the LEDs. A system implemented according to the formulas is able to compensate for the non-uniform color appearance. The conversion coefficients of every pixel of the display are pre-stored in memories, which depend on the maximum luminous intensities and chromaticity coordinates of the virtual primaries and the LEDs. A controller receives the RGB signals and downloads the corresponding conversion coefficients into three arithmetic logic units. The arithmetic logic units execute the computations in parallel that convert the signals according to the derived formulas.

Some displays use more than three original primaries. The Virtual Primary Method can also compensate for the non-uniform color appearances of such displays. A four-primary LED display is taken as an example. Also we must choose a set of four virtual primaries from the distributions of the chromaticity coordinates of the four original primaries. Since, there are usually only red, green, and blue video signals, such a display requires a color separation rule to obtain four video signals. From this rule together with the condition that the tristimulus values of the LEDs in a pixel are equal to those of the virtual primaries, we can derive the formulas relating the RGB signals to the four modified video signals. The other way is to convert RGB video signal into four video signals by the color separation rule first. Then, from the condition that the tristimulus values of the LEDs in a pixel are equal to those of virtual primaries, we can derive the formulas relating the four video signals to the four modified video signals. Systems implemented to convert the signals by the above methods are shown. Their operation principles are similar to that of the three-primary display shown above.

DESCRIPTION OF THE PREFERRED EMBODIMENTS

Figure 1:
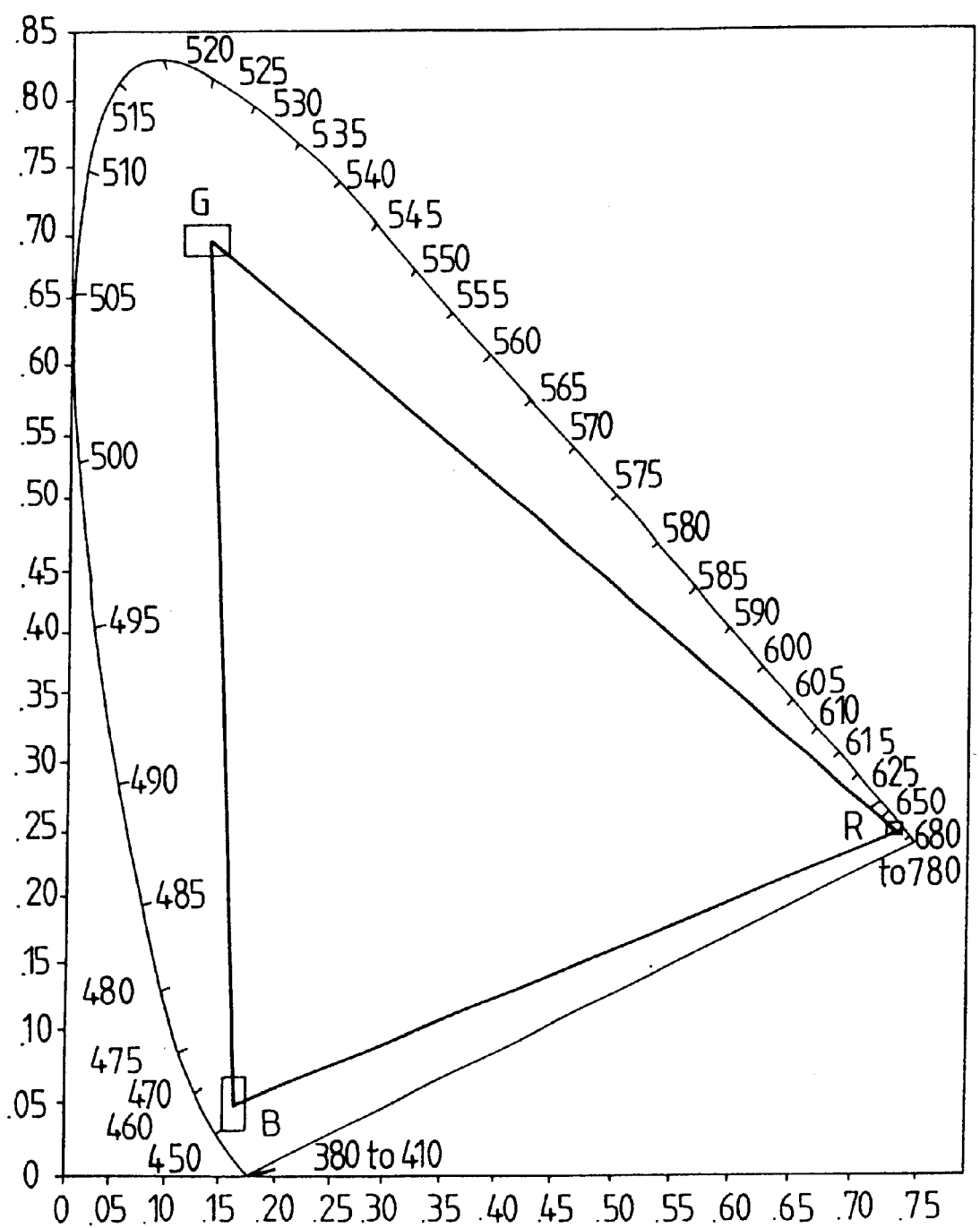
FIG. 1 is an example of the distributions of original primaries in the CIE 1931 (x,y)-chromaticity diagram, wherein a producible chromaticity triangle is also shown.

Color appearance can be numerically described by a color space. The CIE 1931 color space is used to show the virtual Primary Method. However, other color spaces can also be used. As shown in FIG. 1, the chromaticity coordinates of red, green, and blue original primaries are distributed in the rectangles R, G, and B, respectively. In practice, the distribution area can be of any shape and the area is called the original primary area (OPA). In FIG. 1 the coordinates of the apexes of a triangle are the coordinates of a set of original primaries. The area inside the triangle represents the chromaticities that are producible with those primaries. The triangle is called the producible chromaticity triangle (PCT). Note that, in a pixel of the display, each apex of the PCT can be any point within its corresponding OPA. The PCT with the apexes within red, green, and blue OPAs, respectively, is called an original PCT. The PCT with the apexes at the coordinates of virtual primaries is called the virtual PCT.

Figure 2:
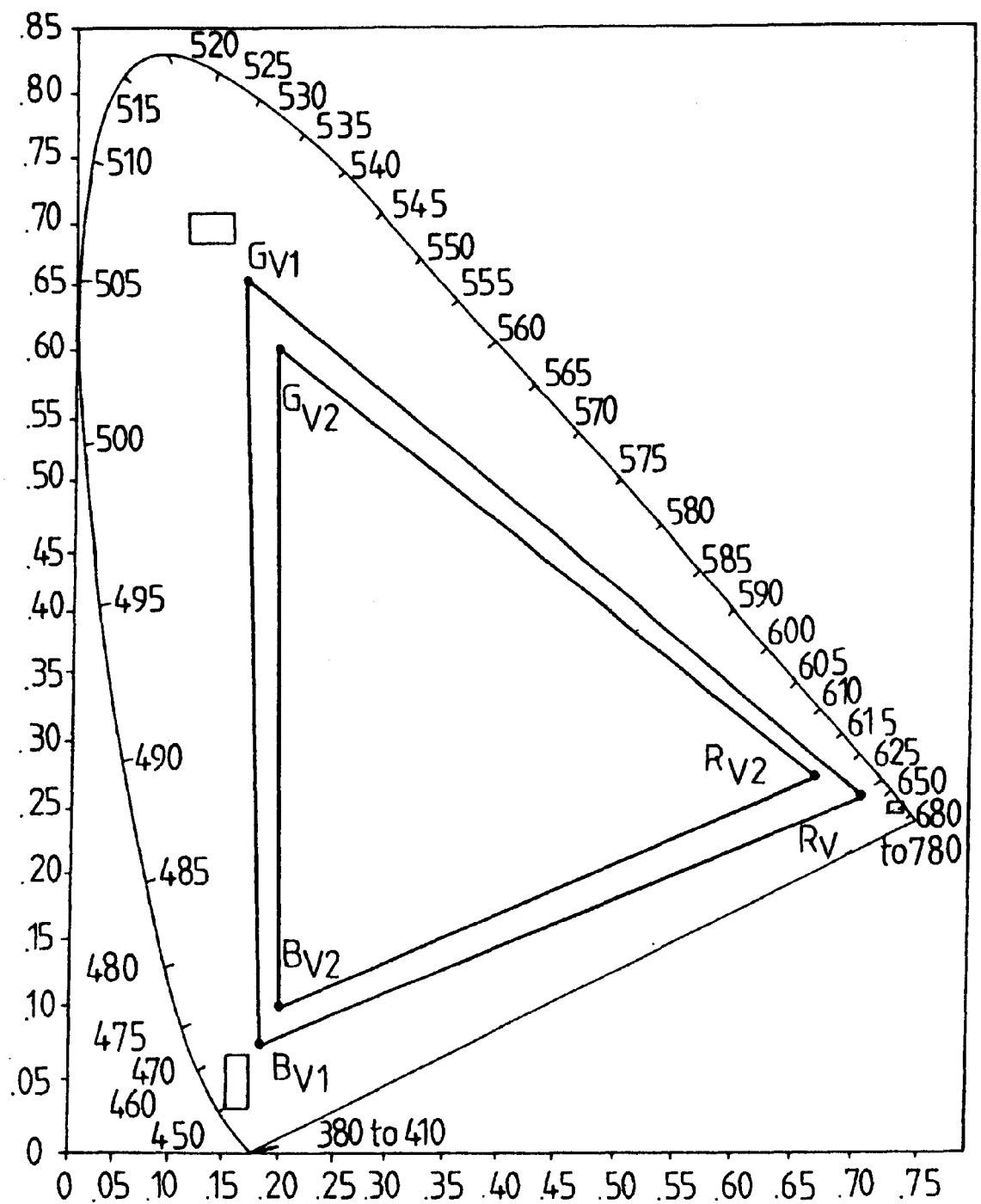
FIG. 2 shows two sets of virtual primaries chosen based on FIG. 1, wherein the corresponding virtual producible chromaticity triangles are also shown.

The virtual primaries can be chosen so that its PCT is within any possible original PCT. Therefore any pixel of the display is able to show the same virtual PCT. This method has to pay the expense of having a smaller PCT area. However, for LED displays, the area of virtual PCT is still larger than the PCTs of many display technologies, such as cathode ray tube (CRT) or liquid crystal display (LCD), because the saturation of the color of LED is high. The choice of virtual primaries is not unique. For the distributions of the original primaries shown in FIG. 1, two sets of virtual primaries are shown in FIG. 2 for example, where $R_{vi}$, $G_{vi}$, and $B_{vi}$ indicate the red, green, and blue virtual primaries of the set i, (i=1,2), respectively. In FIG. 2, the corresponding virtual PCTs are also shown. One can see that the virtual PCT of set 1 is larger than set 2, and its chromaticity is richer. The virtual PCT of the maximum area can be found from all the original PCTs with apexes at the boundaries of their corresponding OPAs. However, the choice of virtual primaries depends on the requirements of application, and the maximum area may not be the optimal choice. For example, the virtual primaries can be chosen to simulate the primaries of the other display technologies such as CRT or LCD.

The output light of the LED in a displayed may be amplitude modulated or pulse-width modulated. By amplitude modulation, the luminous intensity of the output light is proportional to the signal. By pulse-width modulation, the time is sliced into a sequence of equal-interval slots and the width of the output light pulse within a time slot is proportional to the signal. When the interval of the time slot is small enough, the visual brightness is proportional to the luminous intensity averaged over the time slot. Therefore, though the instantaneous luminous intensities of the light pulses of square shape is the same for all time slots, the visual effect is the same as the case of amplitude modulation. In the following, when the method is applied to the system with pulse-width modulation, the term "luminous intensity" is the luminous intensity averaged over the interval of a time slot. Therefore, when the luminous intensity I is written as $I = s \times I^m$ where $0 \leq s \leq 1$ and $I^m$ is the maximum luminous intensity, for the system with amplitude modulation, s relates to the amplitude of the driving signal which modulates LED; for the system with pulse-width modulation, s relates to the pulse-width of the driving signal. Note that the maximum luminous intensity is not the maximum producible luminous intensity of an LED but the luminous intensity under rating operating current.

The chromaticity coordinates of the red, green, and blue virtual primaries are assumed to be $(x_{vr}, y_{vr})$, $(x_{vg}, y_{vg})$, and $(x_{vb}, Y_{vb})$, respectively. The maximum luminous intensities of the red, green, and blue virtual primaries can be defined as $I_{vr}^m$, $I_{vg}^m$, and $I_{vb}^m$, respectively. The maximum luminous intensities are chosen so that the required luminous intensities of the original primaries to produce a virtual primary are always not negative and the ratios among them satisfy white balance condition. A method to choose the virtual primaries will be given later, which ensures that the required luminous intensities of the original primaries to produce a virtual primary are always not negative. The virtual primary method can be used to compensate for a still image as well as a video image. For a video image, pictures are displayed at a frame rate above critical flicker frequency. If the luminous intensities of red, green, and blue virtual primaries to be emitted at the n-th frame and the j-th pixel are $I_{vr}(n,j)$, $I_{vg}(n,j)$, and $I_{vb}(n,j)$, where n, j=1, 2, 3 . . . , we have $$I_{v\alpha}(n,j) = s_\alpha(n,j) I_{v\alpha}^m, (\alpha = r, g, b), \qquad (1)$$

where $s_r(n,j)$, $s_g(n,j)$, and $s_b(n,j)$ are the corresponding red, green, and blue video signals, respectively, and $$0 \leq s_\alpha(n,j) \leq 1, (\alpha = r, g, b). \qquad (2)$$

The input video signals $s_r(n,j)$, $s_g(n,j)$, and $s_b(n,j)$ are usually called the RGB video signals.

The CIE tristimulus values and chromaticity coordinates are related by $$X_{v\alpha}^m = h(x_{v\alpha}/y_{v\alpha}) I_{v\alpha}^m,$$

$$Y_{v\alpha}^m = h I^{v\alpha m}, (\alpha = r, g, b)$$

$$Z_{v\alpha}^m = h[(1 - x_{v\alpha} - y_{v\alpha})/y_{v\alpha}] I_{v\alpha}^m, \qquad (3a)$$

and $$X_{v\alpha}(n,j) = h(x_{v\alpha}/y_{v\alpha}) I_{v\alpha}(n,j),$$

$$Y_{v\alpha}(n,j) = h I_{v\alpha}(n,j), (\alpha = r, g, b)$$

$$Z_{v\alpha}(n,j) = h[(1 - x_{v\alpha} - y_{v\alpha})/y_{v\alpha}] I_{v\alpha}(n,j), \qquad (3b)$$

where $X_{v\alpha}^m$, $Y_{v\alpha}^m$, and $Z_{v\alpha}^m$ are the maximum tristimulus values of the corresponding virtual primary; $X_{v\alpha}(n,j)$, $Y_{v\alpha}(n,j)$ and $Z_{v\alpha}(n,j)$ are the tristimulus values of the corresponding virtual primary to be displayed in the n-th frame and j-th pixel; and h is a constant relating luminous intensity to Y stimulus value.

For white balance or to increase luminous intensity, more than one LED of the same color in a pixel may be required. For the j-th pixel, the chromaticity coordinates of the i-th red, green, and blue LEDs are assumed to be $(x_{ori}(j), y_{ori}(j))$, $(x_{ogi}(j), y_{ogi}(j))$, and $(x_{obi}(j), y_{obi}(j))$, respectively. The maximum luminous intensities of the i-th red, green, and blue LEDs of the j-th pixel are taken to be $I_{ori}^m(j)$, $I_{ogi}^m(j)$, and $I_{obi}^m(j)$, respectively. The luminous intesities of the i-th red, green, and blue LEDs of the j-th pixel to be emitted at the n-th frame are assumed to be $I_{ori}(n,j)$, $I_{ogi}(n,j)$, and $I_{obi}(n,j)$, respectively. The total luminous intensities of the red, green, and blue LEDs of the j-th pixel to be emitted at the n-th frame are assumed to be $I_{or}^t(n,j)$, $I_{og}^t(n,j)$, and $I_{ob}^t(n,j)$, respectively, and we have $$I_{o\alpha}^t(n, j) = a_\alpha(n, j) \sum_{i=1}^{N_\alpha} I_{o\alpha i}^m(j), (\alpha = r, g, b) \qquad (4)$$

where $N_r$, $N_g$, and $N_b$ are the number of red, green, and blue LEDs in a pixel, respectively; $a_r(n,j), a_g(n,j)$ and $a_b(n,j)$ are the modified red, green, and blue video signals, respectively, and $$0 \leq a_\alpha(n,j) \leq 1, (\alpha = r, g, b). \qquad (5)$$

The CIE tristimulus values and chromaticity coordinates are related by $$X_{o\alpha}^m(j) = h \sum_{i=1}^{N_\alpha} [x_{o\alpha i}(j)/y_{o\alpha i}(j)] I_{o\alpha i}^m(j), \qquad (6a)$$

$$Y_{o\alpha}^m(j) = h \sum_{i=1}^{N_\alpha} I_{o\alpha i}^m(j), (\alpha = r, g, b)$$

$$Z_{o\alpha}^m(j) = h \sum_{i=1}^{N_\alpha} \{[1 - x_{o\alpha i}(j) - y_{o\alpha i}(j)]/y_{o\alpha i}(j)\} I_{o\alpha i}^m(j),$$

and $$X_{o\alpha}^t(n, j) = h \sum_{i=1}^{N_\alpha} [x_{o\alpha i}(j)/y_{o\alpha i}(j)] I_{o\alpha i}(n, j), \qquad (6b)$$

$$Y_{o\alpha}^t(n, j) = h \sum_{i=1}^{N_\alpha} I_{o\alpha i}(n, j), (\alpha = r, g, b)$$

$$Z_{o\alpha}^t(n, j) = h \sum_{i=1}^{N_\alpha} \{[1 - x_{o\alpha i}(j) - y_{o\alpha i}(j)]/y_{o\alpha i}(j)\} I_{o\alpha i}(n, j),$$

where $X_{0\alpha hu\,m}(j), Y_{0\alpha}^m(j)$ and $Z_{0\alpha hu\,m}(j)$, and $Z_{0\alpha hu\,m}(j)$ are the maximum tristimulus values of the corresponding original primaries in the j-th pixel; $X_{0\alpha}'(n,j), Y_{0\alpha}'(n,j)$, and $Z_{0\alpha}^t(n,j)$ are the total tristimulus values of the corresponding original primaries to be displayed in the n-th frame and j-th pixel.

A method to choose the virtual primaries for a given LED display is given here, which ensures that the required luminous intensities of the original primaries to produce a virtual primary are always not negative. The maximum tristimulus values of red virtual primary are chosen as $$X_{vr}^m = \text{Min}\{X_{0\,r}^m(j)\},$$

$$Z_{vr}^m = \text{Max}\{Y_{0\,r}^m(j)\},$$

$$Z_{vr}^m = \text{Max}\{Z_{0\,r}^m(j)\} \qquad (7a)$$

where $\text{Min}\{V(j)\}$ is the minimum V value for all j and Max $\{V(j)\}$ is the maximum V value for all j. The maximum tristimulus values of green virtual primary are chosen as $$X_{vg}^m = \text{Max}\{X_{0\,g}^m(j)\},$$

$$Y_{vg}^m = \text{Min}\{Y_{0\,g}^m(j)\},$$

$$Z_{vg}^m = \text{Max}\{Z_{0\,g}^m(j)\} \qquad (7b)$$

The maximum tristimulus values of blue virtual primary are chosen as $$X_{vb}^m = \text{Max}\{X_{0\,b}^m(j)\},$$

$$Y_{vb}^m = \text{Max}\{Y_{0\,b}^m(j)\},$$

$$Z_{vb}^m = \text{Min}\{Z_{0\,b}^m(j)\}. \qquad (7c)$$

From Eqs. (7a)–(7c), the maximum luminous intensities and chromaticity coordinates of the virtual primaries can be determined. Of course, the maximum luminous intensities must be re-adjusted to satisfy the white balance condition. The equations work owing to the fact that the X stimulus value of the red LED, the Y stimulus value of the green LED, and the Z stimulus value of the blue LED are usually much larger than the other two stimulus values of the red LED, green LED, and blue LED, respectively. Here we take the red virtual primary as an example to explain this method. As the chosen X stimulus value is minimum, it can be produced by the red LEDs for every pixel. Though the chosen Y and Z stimulus values are maximum, if they cannot be completely produced by the red LEDs, the deficiencies can be produced by the green and blue LEDs in the same pixel. Thus, the requirement given by Eq. (5) can be satisfied. Eqs. (7a)–(7c) are applied to the case in which the LEDs have been placed in every pixel of the display. When the virtual primaries are required to be determined before the LEDs are placed in the display, this method can also be applied by slightly modifying the equations. This is a simple method to choose the virtual primaries, though it does not lead to the optimal choice. The optimal choice requires an extensive numerical calculation effort.

In the following, the method to find the relation between video signals and modified video signals are given. If the tristimulus values of the LEDs in a pixel are set to be equal to those of virtual primaries, the non-uniform color appearance can be compensated. This condition can be written as $$\sum_{\alpha=r,g,b} X^t_{0\alpha}(n, j) = \sum_{\alpha=r,g,b} X_{v\alpha}(n, j), \quad (8)$$

$$\sum_{\alpha=r,g,b} Y^t_{0\alpha}(n, j) = \sum_{\alpha=r,g,b} Y_{v\alpha}(n, j),$$

$$\sum_{\alpha=r,g,b} Z^t_{0\alpha}(n, j) = \sum_{\alpha=r,g,b} Z_{v\alpha}(n, j).$$

Thus, from the condition given by Eq. (8), we have the modified video signals $$a_r(n,j)=c_{rr}(j)s_r(n,j)+c_{rg}(j)s_g(n,j)+c_{rb}(j)s_b(n,j),$$

$$a_g(n,j)=c_{gr}(j)s_r(n,j)+c_{gg}(j)s_g(n,j)+c_{gb}(j)s_b(n,j),$$

$$a_b(n,j)=c_{br}(j)s_r(n,j)+c_{bg}(j)s_g(n,j)+c_{bb}(j)s_b(n,j). \quad (9)$$

Note that, for a pixel on a screen of a scanning LED display, the original primaries may successively emit light and the modified video signals may not be used at the same time. In Eq. (9), $c_{\alpha\beta}(j)$, ($\alpha,\beta=r,g,b$), are the converting coefficients and $$c_{\alpha\beta}(j)=[d_{\alpha x}(j)X_{v\beta}{}^m+d_{\alpha y}(j)Y_{v\beta}{}^m+d_{\alpha z}(j)Z_{v\beta}{}^m]/\Delta(j), \quad (10)$$

where $d_{rx}(j)=Y_{0\,g}{}^m(j)Z_{0\,b}{}^m(j)-Y_{0\,b}{}^m(j)Z_{0\,g}{}^m(j),$
$d_{ry}(j)=X_{0\,b}{}^m(j)Z_{0\,g}{}^m(j)-X_{0\,g}{}^m(j)Z_{0\,b}{}^m(j),$
$d_{rz}(j)=X_{0\,g}{}^m(j)Y_{0\,b}{}^m(j)-X_{0\,b}{}^m(j)Y_{0\,g}{}^m(j),$
$d_{gx}(j)=Y_{0\,b}{}^m(j)Z_{0\,r}{}^m(j)-Y_{0\,r}{}^m(j)Z_{0\,b}{}^m(j),$
$d_{gy}(j)=X_{0\,r}{}^m(j)Z_{0\,b}{}^m(j)-X_{0\,b}{}^m(j)Z_{0\,r}{}^m(j),$
$d_{gz}(j)=X_{0\,b}{}^m(j)Y_{0\,r}{}^m(j)-X_{0\,r}{}^m(j)Y_{0\,b}{}^m(j),$
$d_{bx}(j)=Y_{0\,r}{}^m(j)Z_{0\,g}{}^m(j)-Y_{0\,g}{}^m(j)Z_{0\,r}{}^m(j),$
$d_{by}(j)=X_{0\,g}{}^m(j)Z_{0\,r}{}^m(j)-X_{0\,r}{}^m(j)Z_{0\,g}{}^m(j),$
$d_{bz}(j)=X_{0\,r}{}^m(j)Y_{0\,g}{}^m(j)-X_{0\,g}{}^m(j)Y_{0\,r}{}^m(j),$ $$\Delta(j) = \begin{vmatrix} X^m_{or}(j) & X^m_{og}(j) & X^m_{ob}(j) \\ Y^m_{or}(j) & Y^m_{og}(j) & Y^m_{ob}(j) \\ Z^m_{or}(j) & Z^m_{og}(j) & Z^m_{ob}(j) \end{vmatrix}$$

Obviously, to utilize the virtual primary method, the chromaticity coordinates and luminous intensity of every LED in a display must be measured so that the coefficients $c_{\alpha\beta}(j)$, ($\alpha,\beta=r,g,b$), defined in Eq. (10) can be obtained. Then, the video signals can be converted into the modified video signals according to Eq. (9) either by using software or hardware. The modified video signals are the input signals of LEDs. The light output of an LED can be amplitude modulated or pulse-width modulated by a modified video signal. Note that, in practice, the luminous intensity of an LED is not linearly proportional to the amplitude of driving current for amplitude modulation or the pulse width of driving current for pulse-width modulation. To compensate for the nonlinear relationship, the modified video signals should be further modified before they are used to modulate the driving currents of LEDs so that the tristimulus values of LEDs in a pixel are equal to those of virtual primaries.

Figure 3:
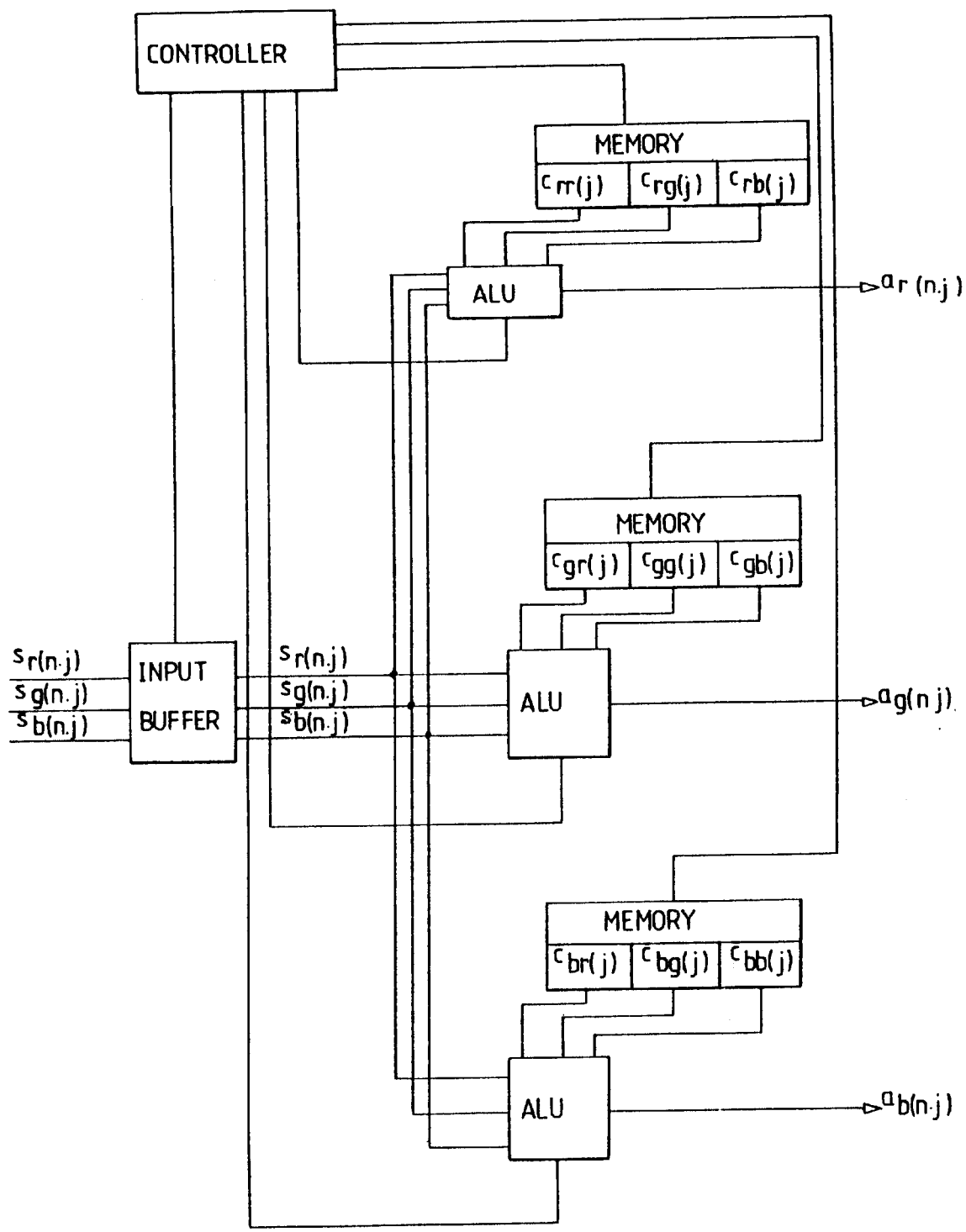
FIG. 3 is a block diagram showing the system that converts RGB signals into modified RGB signals to compensate for non-uniform color appearance.
Figure 4:
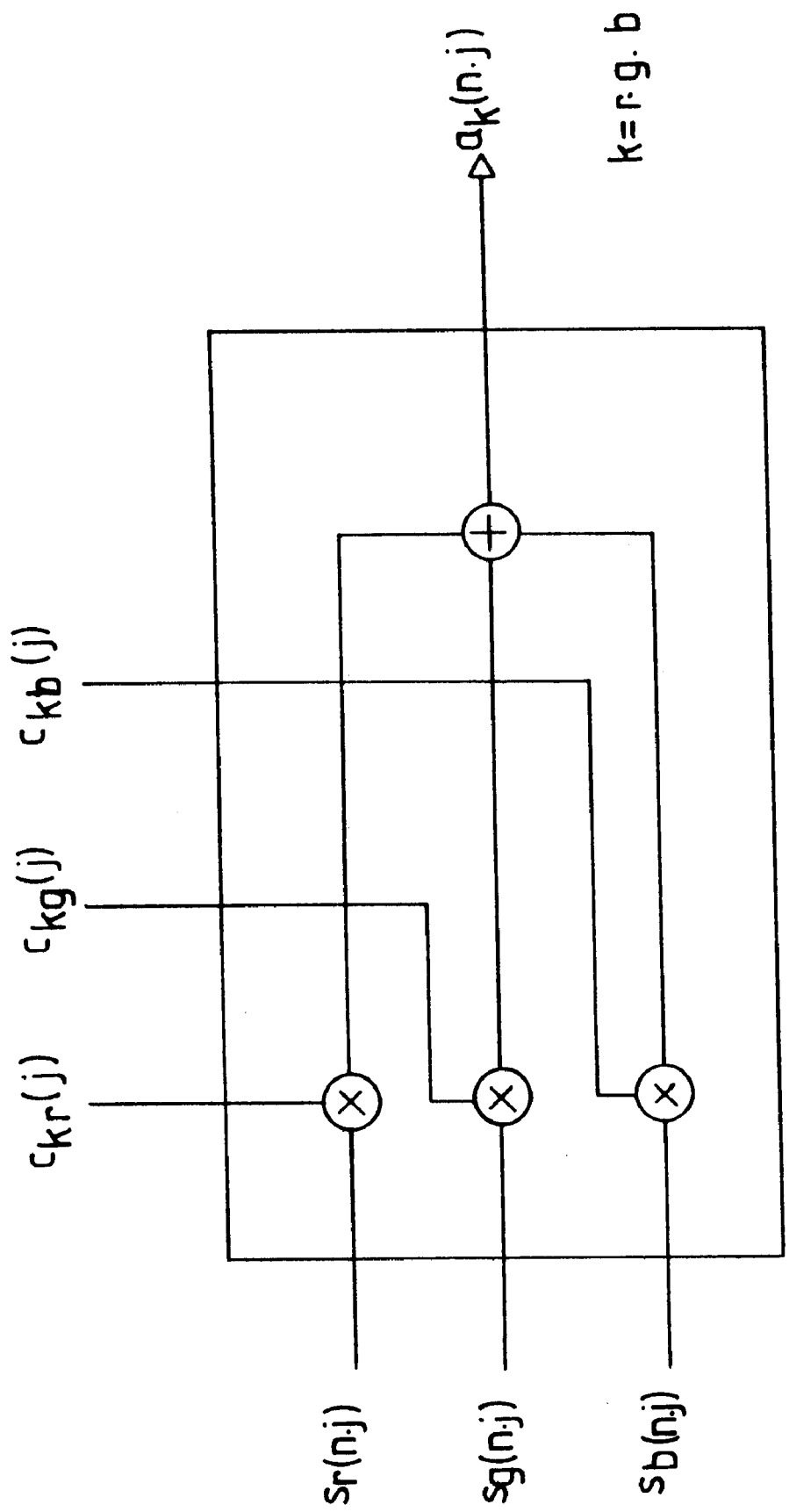
FIG. 4 shows the operation of an arithmetic logic unit (ALU) shown in FIG. 3.

FIG. 3 is a block diagram showing the system implemented to convert the signals. The conversion coefficients, $c_{\alpha\beta}(j)$, of every pixel of the display are calculated according to Eq.(10) and pre-stored in memories. A controller receives the input video signals $s_r(n,j)$, $s_g(n,j)$, and $s_b(n,j)$ and downloads the corresponding conversion coefficients into three arithmetic logic units (ALUs). The ALUs execute the computations in parallel to convert the signals according to Eq.(9). FIG. 4 shows the operation of an ALU. The outputs of the ALUs are the modified video signals.

Figure 5:
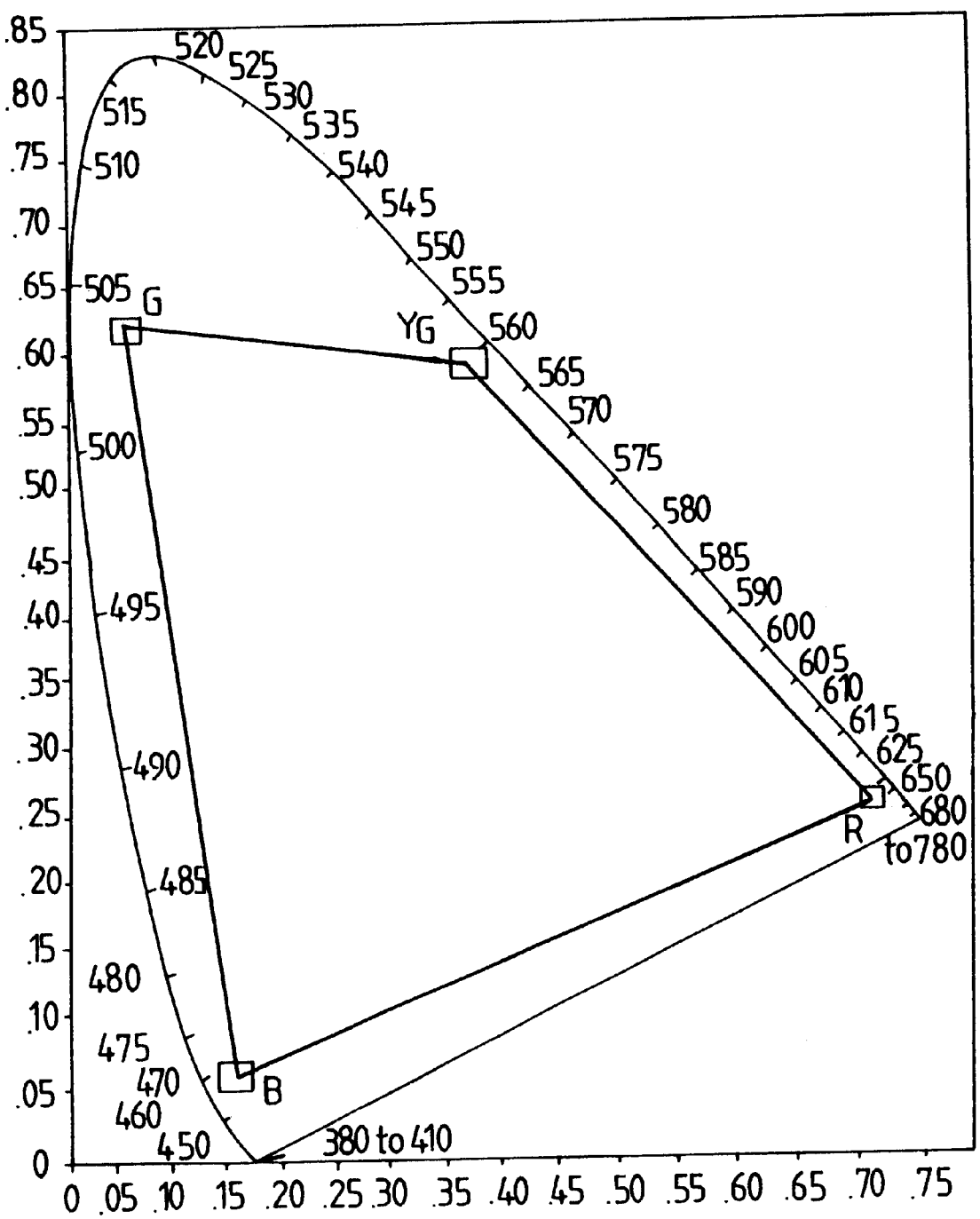
FIG. 5 is an example of the distributions of four original primaries in the CIE 1931 (x,y)-chromaticity diagram, wherein a producible chromaticity tetragon is also shown.
Figure 6:
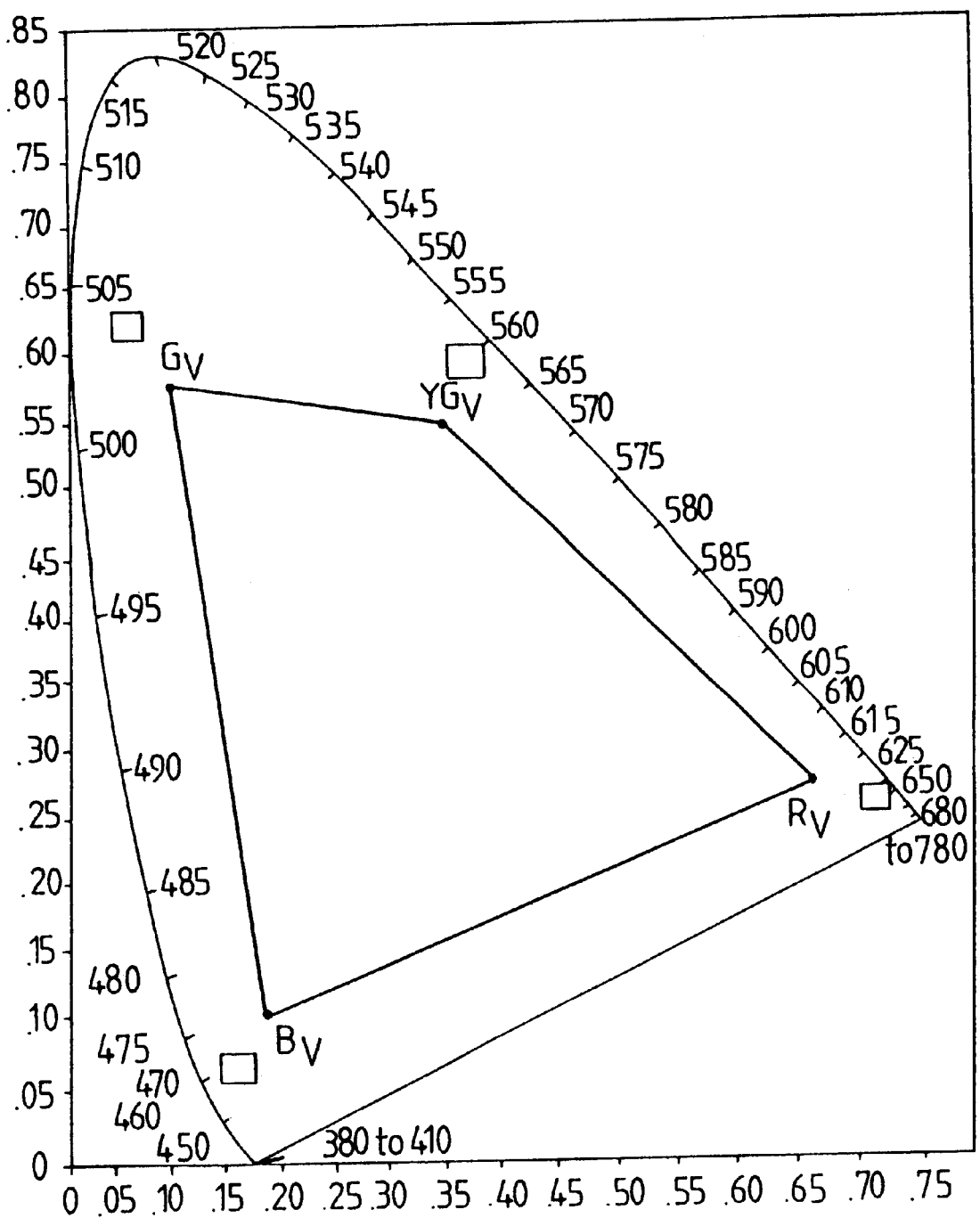
FIG. 6 shows a set of four virtual primaries chosen based on FIG. 5, wherein the corresponding virtual producible chromaticity tetragon is also shown.

If more than three primaries are used in a display, the producible chromaticity area can be enlarged. The non-uniform color appearance of such a display can also be compensated by the virtual primary method. For example, some dot-matrix LED displays use four primaries as are shown in FIG. 5, in which a yellow-green primary is used in addition to red, green, and blue primaries. In FIG. 5, the chromaticity coordinates of red, yellow-green, green, and blue original primaries are distributed in the rectangles R, YG, G, and B, respectively. A producible chromaticity tetragon with its apexes within OPAs is also shown in FIG. 5. Such a tetragon is the original producible chromaticity tetragon. The virtual primaries can be chosen so that its producible chromaticity tetragon is within any possible original producible tetragon. A set of four virtual primaries is shown in FIG. 6 for example. The maximum luminous intensities of the four virtual primaries also must be properly chosen so that the required luminous intensities of the original primaries to produce a virtual primary are always not negative and the ratios among them satisfy the white balance condition.

Since, there are usually only red, green, and blue video signals. The four-primary display requires a color separation rule to obtain the four video signals corresponding to the four primaries respectively. From this rule together with Eq. (8), in which the tristimulus values are summed over the four primaries, the modified video signals $a_r(n,j)$, $a_y(n,j)$, $a_g(n,j)$ and $a_b(n,j)$ for red, yellow-green, green, and blue LEDs, respectively, can be obtained. The result can be written as $$a_r(n,j)=c'_{rr}(j)s_r(n,j)+c'_{rg}(j)s_g(n,j)+c'_{rb}(j)s_b(n,j),$$

$$a_y(n,j)=c'_{yr}(j)s_r(n,j)+c'_{yg}(j)s_g(n,j)+c'_{yb}(j)s_b(n,j),$$

$$a_g(n,j)=c'_{gr}(j)s_r(n,j)+c'_{gg}(j)s_g(n,j)+c'_{gb}(j)s_b(n,j), \quad (11)$$

$$a_b(n,j)=c_{br}(j)s_r(n,j)+c_{bg}(j)s_g(n,j)+c_{bb}(j)s_b(n,j), \quad (11)$$

where $c'_{\alpha\beta}(j)$, ($\alpha=r,y,g,b;,\beta=r,g,b$), are the converting coefficients. From Eq. (11) this method can be implemented.

Figure 7:
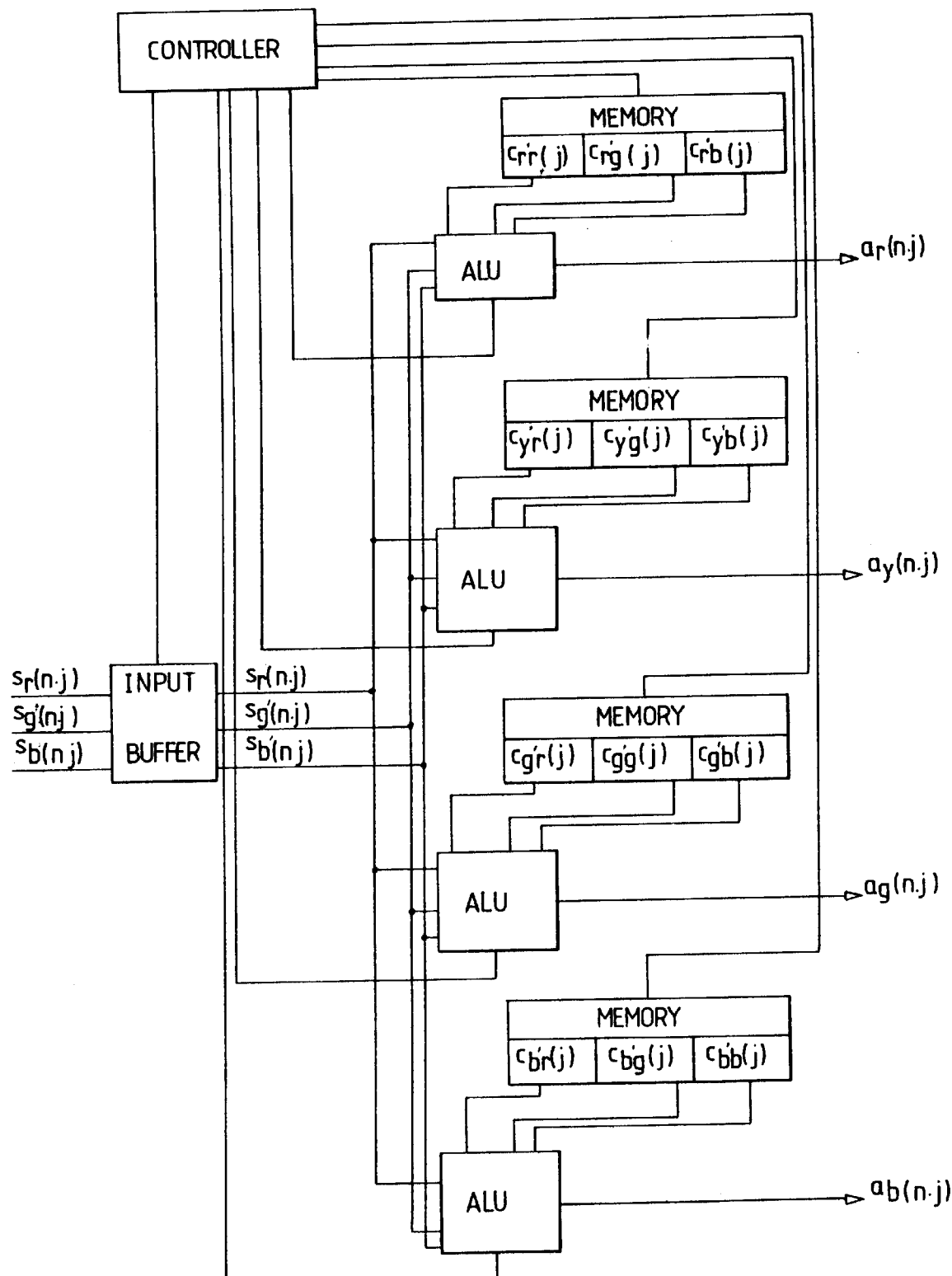
FIG. 7 is a block diagram showing the system that converts the RGB signals into four modified video signals to compensate for the non-uniform color appearance of a four-primary display.

FIG.7 is a block diagram showing the system implemented to convert the three input video signals into the four modified video signals according to Eq. (11). The principle of operation is similar to the block diagram shown in FIG.3. The operation of an ALU shown in FIG. 7 is the same as that shown in FIG. 4. The outputs of the four ALUs are the modified video signals.

The other possible implementation of the system compensating for the non-uniform color appearance of the four-primary display is to obtain the four video signals s″hd r(n,j), s″$_y$(n,j), s″$_g$(n,j), and s″$_b$(n,j) corresponding to red, yellow-green, green, and blue primaries, respectively, by the color separation rule first and then convert the four video signal into modified video signals. Following similar procedures to obtain Eq. (9), we have $$a_r(n,j)=c'_{r,r}(j)s''_r(n,j) +c'_{r,y}(j)s''_y(n,j)+c'_{r,g}(j)s''_g(n,j)$$

$$a_y(n,j)=c'_{y,r}(j)s''_r(n,j) +c'_{y,y}(j)s''_y(n,j)+c'_{y,g}(j)s''_g(n,j)$$

$$a_g(n,j)=c'_{g,r}(j)s''_r(n,j) +c'_{g,y}(j)s''_y(n,j)c'_{g,y}(n,j)s''_y(n,j)$$

$$+c'_{g,g}(j)s''_g(n,j)+c'_{g,b}(j)s''_b(n,j),\ a_b(n,j)=c'_{b,r}(j)s''_r(n,h)$$

$$+c'_{b,y}(j)s''_y(n,j)+c'_{b,g}(j)s''_g(n,j) +c'_{b,b}(j)s''_b(n,j), \quad (12)$$

where $c'_{\alpha,\beta}(j)$, ($\alpha$=r,y,g,b; $\beta$=r,y,g,b), are the converting coefficients. Note that the solutions of the conversion coefficients are not unique. From Eq.(12) this method can be implemented.

Figure 8:
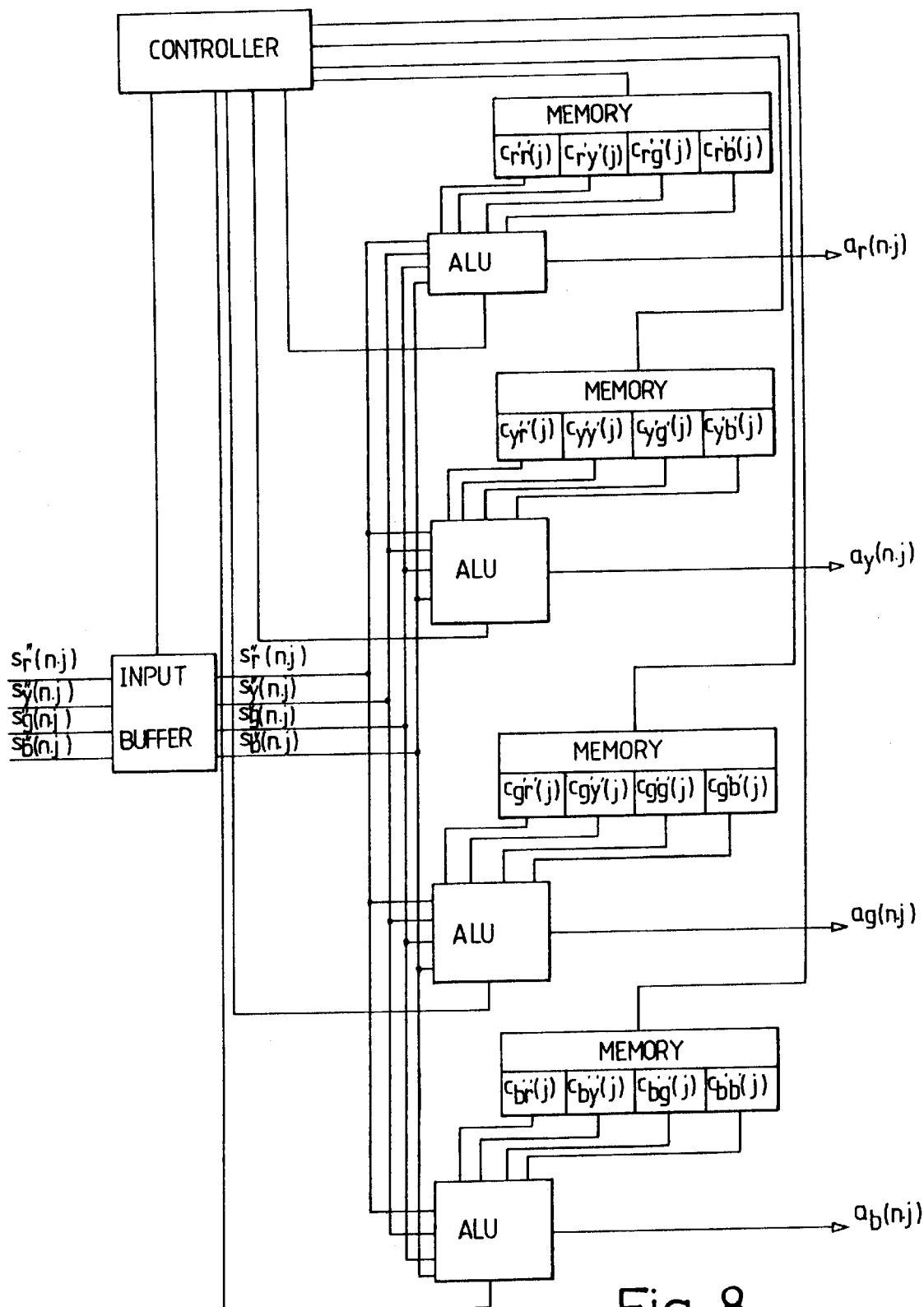
FIG. 8 is a block diagram showing the system that converts four video signals into four modified video signals to compensate for the non-uniform color appearance of a four-primary display.
Figure 9:
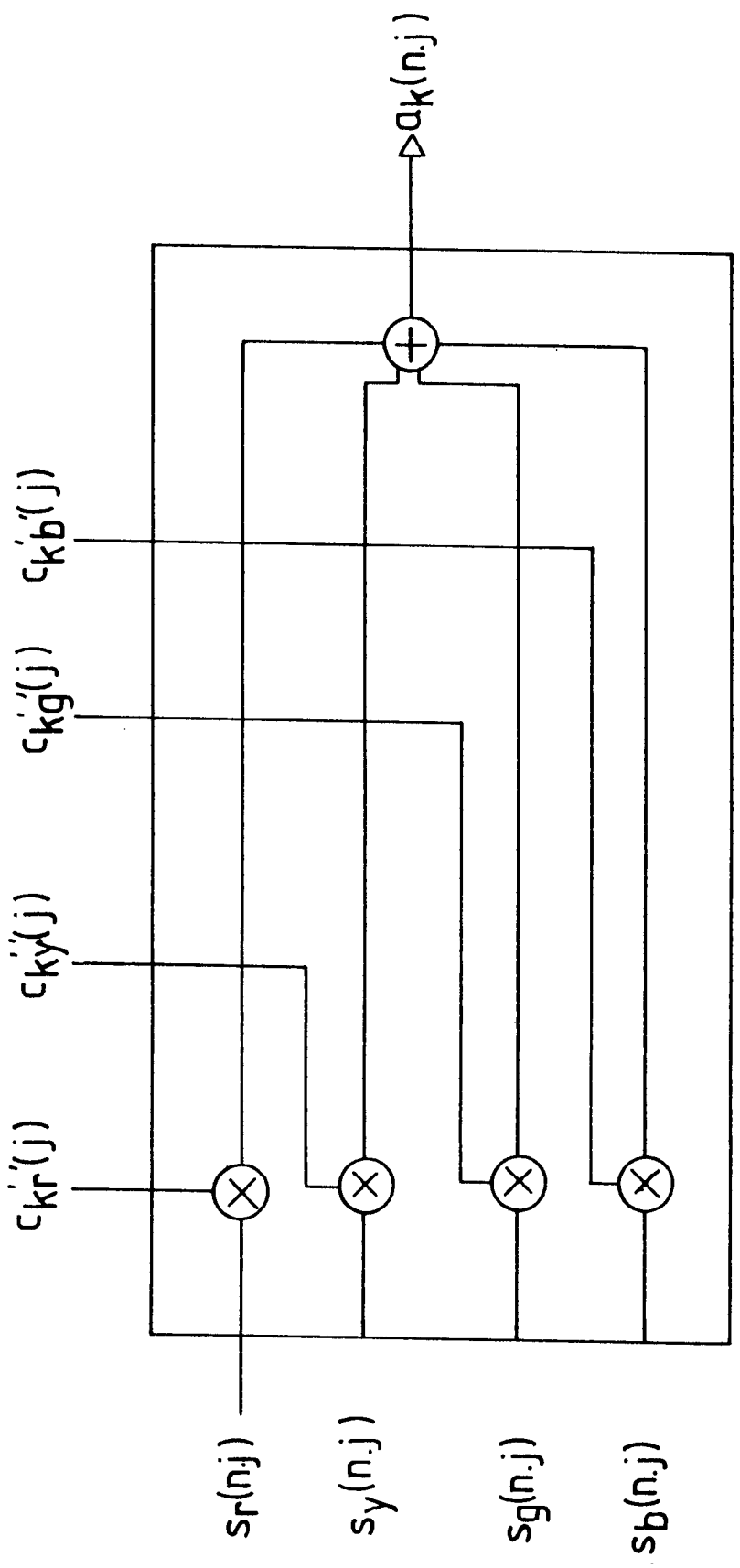
FIG. 9 shows the operation of an arithmetic logic unit (ALU) shown in FIG. 8.

FIG. 8 is a block diagram showing the system implemented to convert the four input video signals into the four modified video signals according to Eq. (12). The principle of operation is similar to the block diagram shown in FIG. 3. FIG. 9 shows the operation of an ALU shown in FIG. 8. The outputs of the four ALUs are the modified video signals.

What is claimed is:

1. A method of compensating for the non-uniform color appearance of a color display that is due to the variations of primary colors of the light sources which are called the original primaries, comprising the steps of:

measuring the chromaticity coordinates and the maximum luminous intensity of every original primary in every pixel of the display, wherein the maximum luminous intensity is not the maximum producible luminous intensity of the original primary but the luminous intensity under rating operating current or voltage and the term "luminous intensity" is the luminous intensity averaged over the interval of a time slot when the output light of the original primary is pulse-width modulated;

choosing a set of virtual primaries, which are characterized by chromaticity coordinates and the maximum luminous intensities, from the measured data of all the original primaries so that the tristimulus values of each virtual primary can be produced by the original primaries in every pixel of the display, in which the chosen virtual primaries can be effectively used as the light sources in stead of the original primaries and the color appearance of the display can be made to be uniform because the virtual primaries are the same for all pixels of the display;

finding the relation between video signals and modified video signals which are the input signals of light sources so that the tristimulus values of the original primaries in a pixel of the display are equal or close to the tristimulus values of the virtual primaries, wherein the tristimulus values of the original primaries can be set to be not exactly equal to the tristimulus values of the virtual primaries, if the deviations are small enough so that the non-uniformity of the displayed color can be tolerated;

calculating conversion coefficients;

converting video signals into modified video signals;

generating the driving signals of the original primaries of the display from the modified video signals.

2. The method as claimed in claim 1, wherein a method to choose the virtual primaries for the display with three or more primary colors based on the principle that the tristimulus values of each virtual primary can be produced by any possible combination of the original primaries in every pixel of the display comprises the steps of:

choosing a set of virtual primaries so that the chromaticity coordinates of each virtual primary can be produced by any possible combination of the original primaries in every pixel;

setting the maximum luminous intensity of each virtual primary to be a lower bound of the maximum luminous intensities of the corresponding original primaries so that the modified video signals are always not negative, and adjusting the ratios among the maximum luminous intensities of virtual primaries according to white balance condition.

3. The method as claimed in claim 2, wherein the method to choose the virtual primaries for the display with three primary colors based on the principle that the tristimulus values of each virtual primary can be produced by any possible combination of the original primaries in every pixel of the display comprises the steps of:

choosing the maximum tristimulus values of red virtual primary as $$X_{vr}{}^m=\text{Min}\{X_{or}{}^m(j)\},$$

$$Y_{vr}{}^m=\text{Max}\{Y_{or}{}^m(j)\},$$

$$Z_{vr}{}^m=\text{Max}\{Z_{or}{}^m(j)\},$$

where $X_{or}{}^m(j)$, $Y_{or}{}^m(j)$, and $Z_{or}{}^m(j)$ are the maximum tristimulus values of the red original primaries in the j-th pixel of the display, Min$\{V(j)\}$ is the minimum V value for all j and Max$\{(j)\}$ is the maximum V value for all j, and choosing the maximum tristimulus values of green virtual primary as $$X_{vg}{}^m=\text{Max}\{X_{og}{}^m(j)\},$$

$$Y_{vg}{}^m=\text{Min}\{Y_{og}{}^m(j)\},$$

$$Z_{vg}{}^m=\text{Max}\{Z_{og}{}^m(j)\},$$

where $X_{og}{}^m(j)$, $Y_{og}{}^m(j)$, and $Z_{og}{}^m(j)$ are the maximum tristimulus values of the green original primaries in the j-th pixel of the display; and choosing the maximum tristimulus values of blue virtual primary as $$X_{vb}{}^m=\text{Max}\{X_{ob}{}^m(j)\},$$

$$Y_{vb}{}^m=\text{Max}\{Y_{ob}{}^m(j)\},$$

$$Z_{vb}{}^m-\text{Min}\{Z_{ob}{}^m(j)\},$$

where $X_{ob}{}^m(j)$, $Y_{ob}{}^m(j)$, and $Z_{ob}{}^m(j)$ are the maximum tristimulus values of the blue original primaries in the j-th pixel of the display;

calculating the chromaticity coordinates and the maximum luminous intensities of the red, green, and blue virtual primaries from the above chosen maximum tristimulus values of the red, green, and blue virtual primaries, respectively;

adjusting the ratios among the maximum luminous intensities of virtual primaries according to white balance condition.

4. The method as claimed in claim 1, wherein the relation finding step for the display with three primary colors is determined by $$\sum_{\alpha=r,g,b} X_{0\alpha}^t(n, j) = \sum_{\alpha=r,g,b} X_{v\alpha}(n, j),$$

$$\sum_{\alpha=r,g,b} Y_{0\alpha}^t(n, j) = \sum_{\alpha=r,g,b} Y_{v\alpha}(n, j),$$

$$\sum_{\alpha=r,g,b} Z_{0\alpha}^t(n, j) = \sum_{\alpha=r,g,b} Z_{v\alpha}(n, j),$$

where $X_{0\alpha}^t(n,j)$, $Y_{0\alpha}^t(n,j)$, and $Z_{0\alpha}^t(n,j)$ are the total tristimulus values of the original primaries of $\alpha$ primary color, in which $\alpha$ represents red, green, or blue, for the n-th frame and j-th pixel of the display; and $X_{v\alpha}(n,j)$, $Y_{v\alpha}(n,j)$, and $Z_{v\alpha}(n,j)$ are the tristimulus values of the virtual primaries of $\alpha$ primary color, in which $\alpha$ represents red, green, or blue, for the n-th frame and j-th pixel of the display; and the tristimulus values are summed over red, green, and blue primary colors; thus, from the condition given by the above equations, the modified video signals $a_r(n,j)$, $a_g(n,j)$ and $a_b(n,j)$ which are the input signals of the red, green, and blue original primaries, respectively, for the n-th frame and j-th pixel of the display are $$a_\alpha(n, j) = \sum_\beta c_{\alpha\beta}(j) s_\beta(n, j), (\alpha, \beta = r, g, b),$$

where $s_r(n,j)$, $s_g(n,j)$, and $s_b(n,j)$ are the red, green, and blue video signals that are to be modified, respectively, for the n-th frame and j-th pixel of the display; $c_{\alpha\beta}(j)$, is the conversion coefficient for the j-th pixel of the display.

5. The method as claimed in claim 1, wherein the relation finding step for the display with more than three primary colors is determined by $$\sum_\alpha X_{0\alpha}^t(n, j) = \sum_\alpha X_{v\alpha}(n, j),$$

$$\sum_\alpha Y_{0\alpha}^t(n, j) = \sum_\alpha Y_{v\alpha}(n, j),$$

$$\sum_\alpha Z_{0\alpha}^t(n, j) = \sum_\alpha Z_{v\alpha}(n, j),$$

and by the color separation rules which determine the ratios of the luminous intensities among the primary colors and obtain the video signals corresponding to their respective primary colors because there are usually only three input video signals corresponding to three of the primary colors, where $X_{0\alpha}^t(n,j)$, $Y_{0\alpha}^t(n,j)$, and $Z_{0\alpha}^t(n,j)$ are the total tristimulus values of the original primaries of $\alpha$ primary color, in which $\alpha$ represents one of the primary colors, such as red, green, blue, or yellow-green, for the n-th frame and j-th pixel of the display; and $X_{v\alpha}(n,j)$ $Y_{v\alpha}(n,j)$, and $Z_{v\alpha}(n,j)$ are the tristimulus values of the virtual primaries of $\alpha$ primary color, in which $\alpha$ represents one of the primary colors for the n-th frame and j-th pixel of the display; and the tristimulus values are summed over all primary colors; thus, from the condition given by the above equations and the color separation rules, we have the modified video signal $a_\alpha(n,j)$ which is the input signal of the original primaries of $\alpha$ primary color for the n-th frame and j-th pixel, in which $\alpha$ represents one of the primary colors, and $$a_\alpha(n, j) = \sum_\beta c'''_{\alpha\beta}(j) s'''_\beta(n, j),$$

where $s'''_\beta(n,j)$ is the video signal corresponding to the $\beta$ primary color for the n-th frame and the j-th pixel of the display, in which $s'''_\beta(n,j)$ is the input video signal $s_\beta(n,j)$ if only input RGB video signals are going to be modified and $\beta$ represents red, green, or blue; or $s'''_\beta(n,j)$ is the video signal corresponding to one of the primary colors in which $s'''_{62}(n,j)$ has been separated from input RGB video signals by the color separation rules and $\beta$ represents red, green, blue, or additional primary colors; $c'''_{\alpha\beta}(j)$ is the conversion coefficient for the j-th pixel of the display; and the product $c'''_{60\ \beta}(j) s'''_\beta(n,j)$ is summed over all original primaries corresponding to the video signals that are going to be modified.

6. The method as claimed in claim 1, wherein the calculation step is performed by substituting the measured chromaticity coordinates and the maximum luminous intensity of every original primary in every pixel of the display into the formulas of the conversion coefficients derived from the relation finding step.

7. A method of compensating for the non-uniform color appearance of a color display that is due to the variations of primary colors of the light sources which are called the original primaries, wherein the virtual primaries are chosen before the original primaries are placed in the display, comprising the steps of:

measuring the chromaticity coordinates and the maximum luminous intensity of every original primary that is to be used in the display, wherein the maximum luminous intensity is not the maximum producible luminous intensity of the original primary but the luminous intensity under rating operating current or voltage and the term "luminous intensity" is the luminous intensity averaged over the interval of a time slot when the output light of the original primary is pulse-width modulated;

choosing a set of virtual primaries, which are characterized by chromaticity coordinates and the maximum luminous intensities, from the measured data of all the original primaries that are to be used in the display so that the tristimulus values of each virtual primary can be produced by any possible combination of the original primaries in every pixel of the display, in which the chosen virtual primaries can be effectively used as the light sources in stead of the original primaries and, since the virtual primaries are the same for all pixels of the display, the color appearance of the display can be made to be uniform;

measuring the chromaticity coordinates and the maximum luminous intensity of every original primary in every pixel of the display when the original primaries have been placed in the display;

finding the relation between video signals and modified video signals which are the input signals of light sources so that the tristimulus values of the original primaries in a pixel of the display are equal or close to the tristimulus values of the virtual primaries, wherein the tristimulus values of the original primaries can be set to be not exactly equal to the tristimulus values of the virtual primaries, if the deviations are small enough so that the non-uniformity of the displayed color can be tolerated;

calculating conversion coefficients;

converting video signals into modified video signals;

generating the driving signals of the original primaries of the display from the modified video signals.

8. The method as claimed in claim 7, wherein a method to choose the virtual primaries for the display with three or more primary colors based on the principle that the tristimulus values of each virtual primary can be produced by any possible combination of the original primaries in every pixel of the display comprises the steps of:

choosing a set of virtual primaries so that the chromaticity coordinates of each virtual primary can be produced by any possible combination of the original primaries in every pixel;

setting the maximum luminous intensity of each virtual primary to be a lower bound of the maximum luminous intensities of the original primaries so that the modified video signals are always not negative, and adjusting the ratios among the maximum luminous intensities of virtual primaries according to white balance condition.

9. The method as claimed in claim 8, wherein the method to choose the virtual primaries for the display with three primary colors based on the principle that the tristimulus values of each virtual primary can be produced by any possible combination of the original primaries in every pixel of the display comprises the steps of:

choosing the maximum tristimulus values of red virtual primary as $$X_{vr}^m = N_r \times \mathrm{Min}\{X_{or}^m(k)\},$$

$$Y_{vr}^m = N_r \times \mathrm{Max}\{Y_{om}^m(k)\},$$

$$Z_{vr}^m = N_r \times \mathrm{Max}\{Z_{or}^m(k)\},$$

where $N_r$ is the number of red original primaries to be used in a pixel of the display, and $X_{or}^m(k)$, $Y_{or}^m(k)$ and $Z_{or}^m(k)$ are the maximum tristimulus values of the k-th red original primary to be used in the display, $\mathrm{Min}\{V(k)\}$ is the minimum V value for all k and $\mathrm{Max}\{V(k)\}$ is the maximum V value for all k, and choosing the maximum tristimulus values of green virtual primary as $$X_{vg}^m = N_g \times \mathrm{Max}\{X_{og}^m(k)\},$$

$$Y_{vg}^m = N_g \times \mathrm{Min}\{Y_{og}^m(k)\},$$

$$Z_{vg}^m = N_g \times \mathrm{Max}\{Z_{og}^m(k)\},$$

where $N_g$ is the number of green original primaries to be used in a pixel of the display, and $X_{og}^m(k)$, $Y_{og}^m(k)$ and $Z_{og}^m(k)$ are the maximum tristimulus values of the k-th green original primary to be used in the display; and choosing the maximum tristimulus values of blue virtual primary as $$X_{vb}^m = N_b \times \mathrm{Max}\{X_{ob}^m(k)\},$$

$$Y_{vb}^m = N_b \times \mathrm{Max}\{Y_{ob}^m(k)\},$$

$$Z_{vb}^m = N_b \times \mathrm{Min}\{Z_{ob}^m(k)\},$$

where $N_b$ is the number of blue original primaries to be used in a pixel of the display, and $X_{ob}^m(k)$, $Y_{ob}^m(k)$ and $Z_{ob}^m(k)$ are the maximum tristimulus values of the k-th blue original primary to be used in the display;

calculating the chromaticity coordinates and the maximum luminous intensities of the red, green and blue virtual primaries from the above chosen maximum tristimulus values of the red, green, and blue virtual primaries, respectively;

adjusting the ratios among the maximum luminous intensities of virtual primaries according to white balance condition.

10. The method as claimed in claim 7, wherein the relation finding step for the display with three primary colors is determined by $$\sum_{\alpha=r,g,b} X_{0\alpha}^t(n, j) = \sum_{\alpha=r,g,b} X_{v\alpha}(n, j),$$

$$\sum_{\alpha=r,g,b} Y_{0\alpha}^t(n, j) = \sum_{\alpha=r,g,b} Y_{v\alpha}(n, j),$$

$$\sum_{\alpha=r,g,b} Z_{0\alpha}^t(n, j) = \sum_{\alpha=r,g,b} Z_{v\alpha}(n, j),$$

where $X_{o\alpha}^t(n,j)$, $Y_{o\alpha}^t(n,j)$, and $Z_{o\alpha}^t(n,j)$ are the total tristimulus values of the original primaries of $\alpha$ primary color, in which $\alpha$ represents red, green, or blue, for the n-th frame and j-th pixel of the display; and $X_{v\alpha}(n,j)$, $Y_{v\alpha}(n,j)$, and $Z_{v\alpha}(n,j)$ are the tristimulus values of the virtual primaries of a primary color, in which a represents red, green, or blue, for the n-th frame and j-th pixel of the display; and the tristimulus values are summed over red, green, and blue primary colors; thus, from the condition given by the above equations, the modified video signals $a_r(n,j)$, $a_g(n,j)$ and $a_b(n,j)$ which are the input signals of the red, green, and blue original primaries, respectively, for the n-th frame and j-th pixel of the display are $$a_\alpha(n, j) = \sum_\beta c_{\alpha\beta}(j) s_\beta(n, j), \quad (\alpha, \beta = r, g, b),$$

where $s_r(n,j)$, $s_g(nj)$, and $s_b(n,j)$ are the red, green, and blue video signals that are to be modified, respectively, for the n-th frame and j-th pixel of the display; $c_{\alpha\beta}(j)$ is the conversion coefficient for the j-th pixel of the display.

11. The method as claimed in claim 7, wherein the relation finding step for the display with more than three primary colors is determined by $$\sum_\alpha X_{0\alpha}^t(n, j) = \sum_\alpha X_{v\alpha}(n, j),$$

$$\sum_\alpha Y_{0\alpha}^t(n, j) = \sum_\alpha Y_{v\alpha}(n, j),$$

$$\sum_\alpha Z_{0\alpha}^t(n, j) = \sum_\alpha Z_{v\alpha}(n, j)$$

and by the color separation rules which determine the ratios of the luminous intensities among the primary colors and obtain the video signals corresponding to their respective primary colors because there are usually only three input video signals corresponding to three of the primary colors, where $X_{o\alpha}^t(n,j)$, $Y_{o\alpha}^t(n,j)$, and $Z_{o\alpha}^t(n,j)$ are the total tristimulus values of the original primaries of $\alpha$ primary color, in which $\alpha$ represents one of the primary colors, such as red, green, blue, or yellow-green, for the n-th frame and j-th pixel of the display; and $X_{v\alpha}(n,j)$ $Y_{v\alpha}(n,j)$, and $Z_{v\alpha}(n,j)$ are the tristimulus values of the virtual primaries of a primary color, in which $\alpha$ represents one of the primary colors for the n-th frame and j-th pixel of the display; and the tristimulus values are summed over all primary colors; thus, from the condition given by the above equations and the color separation rules, we have the modified video signal $a_\alpha(n,j)$ which is the input signal of the original primaries of α primary color for the nth frame and j-th pixel, in which a represents one of the primary colors, and $$a_\alpha(n, j) = \sum_\beta c'''_{\alpha\beta}(j) s'''_\beta(n, j),$$

where $s'''_\beta(n,j)$ is the video signal corresponding to the β primary color for the n-th frame and j-th pixel of the display, in which $s'''_\beta(n,j)$ is the input video signal $s_\beta(n,j)$ if only input RGB video signals are going to be modified and β represents red, green, or blue; or $s'''_\beta(n,j)$ is the video signal corresponding to one of the primary colors in which $s'''_\beta(n,j)$ has been separated from input RGB video signals by the color separation rules and β represents red, green, blue, or additional primary colors; $c'''_{\alpha\beta}(j)$ is the conversion coefficient for the j-th pixel of the display; and the product $c'''_{\alpha\beta}(j) s'''_\beta(n,j)$ is summed over all original primaries corresponding to the video signals that are going to be modified.

12. The method as claimed in claim 7, wherein the calculation step is determined by substituting the measured chromaticity coordinates and the maximum luminous intensity of every original primary in every pixel of the display into the formulas of the conversion coefficients derived from the relation finding step.

13. A system of converting video signals into modified video signals as claimed in claim 1, comprising the steps of:

memories storing conversion coefficients;

a controller receiving video signals;

downloading corresponding conversion coefficients stored in memories into arithmetic logic units;

commanding the arithmetic logic units to execute the calculations; and arithmetic logic units executing the computations that convert video signals into modified video signals.

14. A system of converting video signals into modified video signals as claimed in claim 7, comprising the steps of:

memories storing conversion coefficients;

a controller receiving video signals;

downloading corresponding conversion coefficients stored in memories into arithmetic logic units;

commanding the arithmetic logic units to execute the calculations; and arithmetic logic units executing the computations that convert video signals into modified video signals.

15. The method as claimed in claim 1, wherein the driving-signal generating step comprises of modulating the driving signals of the original primaries by the modified video signal obtained from the video-signal converting step, in which the modified video signals are required to be further modified before they are used to modulate the driving signals of the original primaries if there exists the nonlinear relationship between the luminous intensity of the original primary and the modulation quantity of the driving signal, such as the amplitude of driving current for amplitude modulation or the pulse width of driving current for pulse-width modulation.

16. The method as claimed in claim 7, wherein the driving-signal generating step comprises of modulating the driving signals of the original primaries by the modified video signal obtained from the video-signal converting step, in which the modified video signals are required to be further modified before they are used to modulate the driving signals of the original primaries if there exists the nonlinear relationship between the luminous intensity of the original primary and the modulation quantity of the driving signal, such as the amplitude of driving current for amplitude modulation or the pulse width of driving current for pulse-width modulation.

* * * * *